Figure 1:
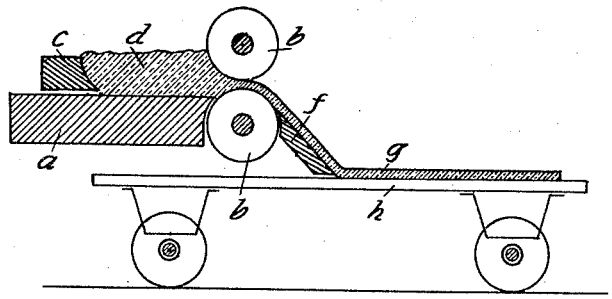

April 10, 1928.

L. VON REIS 1,665,427

MANUFACTURE OF RAW PLATE GLASS ON MULTIROLLER GLASS ROLLING MACHINES

Filed Nov. 5, 1926     2 Sheets-Sheet 1

Inventor:
Lambert von Reis
per Dorsey
Attorneys

Patented Apr. 10, 1928.

1,665,427

UNITED STATES PATENT OFFICE.

LAMBERT von REIS, OF HERZOGENRATH, GERMANY, ASSIGNOR TO MAATSCHAPPY TOT BEHEER EN EXPLOITATIE VAN OCTROOIEN, OF AMSTERDAM, NETHERLANDS.

MANUFACTURE OF RAW PLATE GLASS ON MULTIROLLER GLASS-ROLLING MACHINES.

Application filed November 5, 1926, Serial No. 146,406, and in Germany December 30, 1925.

This invention relates to the manufacture of raw plate glass, suitable for subsequent grinding and polishing, on multi-roller glass rolling machines, and it has more particularly reference to that kind of glass plate rolling in which the molten glass mass is deposited on a stationary or tiltable receiver from which it is passed between a pair of rolls forming the rolling mechanism by which the glass mass is rolled into a plate or sheet of suitable length which, upon emerging from the rolling mechanism, glides down chutes onto conveyors designed to carry the rolled glass, for instance, to a leer.

The invention has for its object to improve the above-stated method and means so as to facilitate the obtaining of a good structure and smooth surface of the glass plates, this being especially of importance with glass plates designed to be subsequently ground and polished in as much as a higher degree of smoothness of the rolled plates allows to shorten the time of grinding. To this end, provision is made according to the invention for independently varying, also during the rolling operation, the inclination of the rolling mechanism so that same may be positioned at any time at an angle which, in accordance with the speed of the rolling and the toughness of the glass mass, is most suitable for obtaining a good structure and surface of the glass plates. This adjustability of the rolling mechanism allows of altering the angle at which the glass mass enters between the rolls, as well as the surface of contact between the glass plate and the rolls from the time the rolling is started until the rolled plate passes onto the chute. To this same end, the invention also provides for a changing of the inclination of the said chute and of glass plate guiding rollers if such are used in the rolling machine.

According to the invention, the rolling mechanism which consists, for instance, of a pair of working rolls is made tiltable both with relation to the glass mass and the surfaces designed to receive the rolled glass plate; there are also made tiltable the means, such as chutes and guide rollers, which guide the glass emerging from the rolling mechanism to the receiving surfaces (conveying tables). The arrangement is so that the tilting may be effected at will before or during the rolling operation.

Another feature of the invention resides in that means are provided for extending or shortening the chutes at both sides of the guide rollers for adjusting their inclination and height in accordance with the position of the working rolls and guide rollers, so that the formation of uninterrupted glide surfaces for the rolled glass plates is always ensured.

Still another feature of the invention consists in that all or some of the adjustable devices may be connected in such a manner as to allow of a simultaneous adjustment of these devices in a desired mutual relation according to the progress of the rolling operation.

Figure 2:
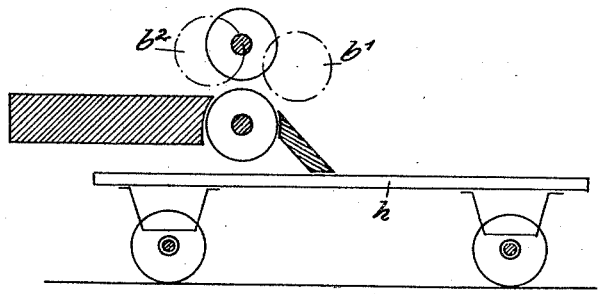
Figure 3:
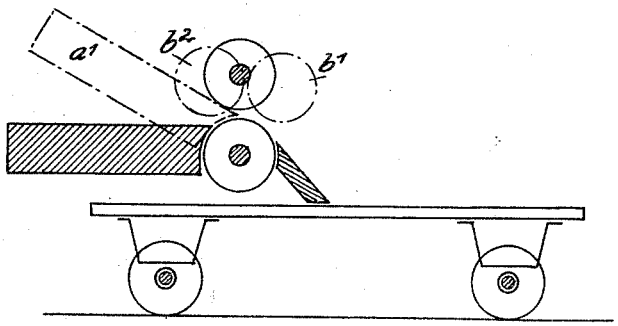
Figure 4:
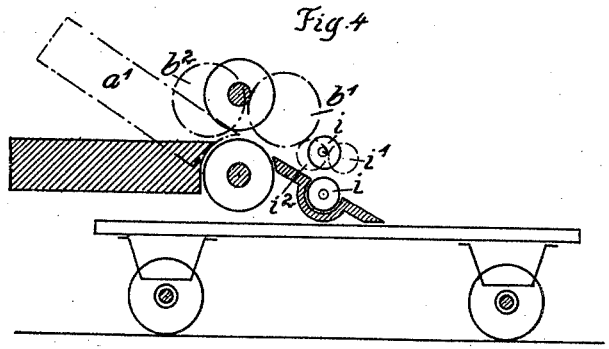
Figure 5:
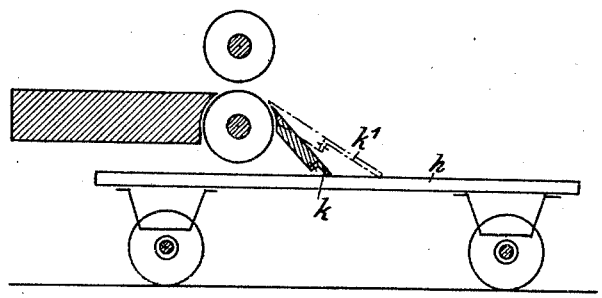
Figure 6:
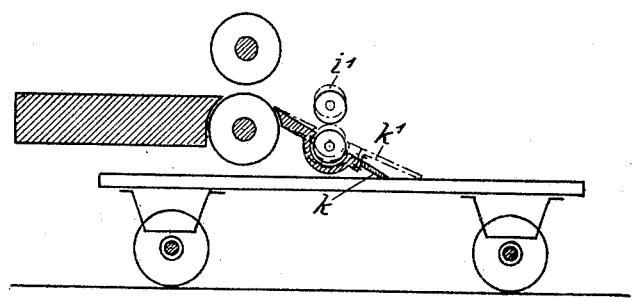

In the drawings:

Fig. 1 is a sectional side elevation of a glass rolling machine of a known type designed to manufacture raw plate glass suitable for subsequent grinding and polishing; Fig. 2 is a similar elevation of the same glass rolling machine provided according to the invention with a rolling mechanism which is tiltable forwardly and rearwardly; Fig. 3 is a similar view of the machine with a tiltable receiver for the glass mass; Fig. 4 shows the same machine with tiltable guide rollers; Fig. 5 shows the same machine with an adjustable chute; and Fig. 6 is still another view of the same machine in which the chute and the guide rollers are adjustable.

In the several figures, $a$ denotes the receiver for the molten glass mass which is to be rolled into plates. $a^1$ indicates the receiver in an inclined position. $b$, $b$ are the rolls forming the rolling mechanism. $b^1$ and $b^2$ indicate the rolls at two different inclined positions. $c$ is a pusher for the glass mass, $d$ is the glass mass itself and $f$ denotes a chute. $k$ and $k^1$ are members adapted to be connected with and disconnected from the chutes for varying the length, inclination and height of the chutes. $g$ is the rolled sheet of glass, $h$ is a conveying table for the rolled glass. $i$, $i$ are adjustable guide rollers in a definite position. $i^1$ and $i^2$ indicate these guide rollers in other positions. The mechanical means for effecting the tilting or adjusting of the several devices may be of any well known kind.

Having thus described my invention, what I claim as new and desire to secure by Letters-Patent is:—

1. A multi-roller glass rolling machine for manufacturing raw plate glass, comprising a tiltable receiver for the molten glass mass to be rolled out, a tiltable rolling mechanism, and adjustable chutes and guide rollers for guiding the rolled glass plates to conveying means.

2. A multi-roller glass rolling machine for manufacturing raw plate glass, comprising a tiltable receiver for the molten glass mass to be rolled out, a tiltable rolling mechanism, chutes and guide rollers for guiding the glass plates emerging from the rolling mechanism, and means adapted to be connected with and disconnected from the said chutes for altering the length and accordingly the inclination and height of the chutes.

3. A multi-roller glass rolling machine for manufacturing raw plate glass, comprising a tiltable receiver for the molten glass mass to be rolled out, a tiltable rolling mechanism, adjustable chutes and guide rollers for the rolled glass plates, and means for interconnecting at least some of the said devices for allowing of a simultaneous relative adjustment of the same.

4. The combination in a glass plate roll machine of a receiver for molten glass, a pair of sheet forming rolls with a pass between them, adapted to receive glass from the receiver, and to make it into sheet form, the receiver and the forming rolls being independently movable about a common axis.

In testimony whereof I have signed my name to this specification.

LAMBERT von REIS.